United States Patent [19]

Ranganathan

[11] Patent Number: 5,615,376

[45] Date of Patent: Mar. 25, 1997

[54] CLOCK MANAGEMENT FOR POWER REDUCTION IN A VIDEO DISPLAY SUB-SYSTEM

[75] Inventor: Ravi Ranganathan, Cupertino, Calif.

[73] Assignee: NeoMagic Corp., Santa Clara, Calif.

[21] Appl. No.: 285,401

[22] Filed: Aug. 3, 1994

[51] Int. Cl.$^6$ .................. G06F 1/00; G06F 1/18
[52] U.S. Cl. .......... 395/750; 395/800; 395/501; 395/502; 395/555; 395/560
[58] Field of Search .................. 395/162, 163, 395/164, 750, 117, 129, 133, 550, 800

[56] References Cited

U.S. PATENT DOCUMENTS

| | | | |
|---|---|---|---|
| 5,189,647 | 2/1993 | Suzuki et al. | 368/10 |
| 5,208,583 | 5/1993 | Cusick et al. | 340/723 |
| 5,254,888 | 10/1993 | Lee et al. | 327/298 |
| 5,375,203 | 12/1994 | Lambidakis | 395/162 |
| 5,375,245 | 12/1994 | Solhjell et al. | 395/750 |
| 5,398,075 | 3/1995 | Freytag et al. | 348/590 |
| 5,418,969 | 5/1995 | Matsuzaki et al. | 395/750 |
| 5,432,905 | 7/1995 | Hsieh et al. | 395/162 |
| 5,446,496 | 8/1995 | Foster et al. | 348/441 |
| 5,452,434 | 9/1995 | MacDonald | 395/550 |
| 5,502,837 | 3/1996 | Hoffert | 395/550 |
| 5,524,249 | 6/1996 | Suboh | 395/750 |
| 5,535,398 | 7/1996 | Biggs et al. | 395/750 |
| 5,537,650 | 7/1996 | West et al. | 395/750 |

*Primary Examiner*—Jack B. Harvey
*Assistant Examiner*—Raymond N. Phan
*Attorney, Agent, or Firm*—Stuart T. Auvinen

[57] ABSTRACT

A video sub-system features reduced power consumption by periodically disabling the video controller clocks used for transferring pixel data to a screen. The video clocks are pulsed only when pixel data is being transferred to the screen, during the time that a horizontal line of pixels is being scanned on the screen. The video clocks are not pulsed during the horizontal and vertical blanking periods, when the electron beam in a cathode-ray-tube is being re-traced. The video clocks are also not pulsed during a recovery period for a flat-panel screen. A video memory contains pixel information for the entire screen and is controlled by a memory controller. The memory controller uses a memory clock to transfer all or part of a horizontal line of pixels to a video buffer. The pixel data is then read out of the video buffer to the screen in a serial fashion, synchronized to the video clock. Host data may be written to a host buffer using a bus clock from the host, and then written to the video memory using the memory clock. The memory clock is only pulsed when data is transferred to or from the video memory, or during memory refresh. The memory clock is not pulsed when the video memory is idle. Power consumption is reduced by enabling or pulsing the memory clock and the internal bus clock only when a transfer request is received, pending, or in progress.

14 Claims, 7 Drawing Sheets

CLOCK MANAGEMENT FOR POWER REDUCTION IN A VIDEO DISPLAY SUB-SYSTEM

BACKGROUND OF THE INVENTION

1. Field of the Invention

This invention relates to video display systems, and more particularly to power reduction by management of the clocks in a video display controller.

2. Description of the Related Art

Display systems are a vital part of most personal computer systems. Graphic displays provide flexibility in sending information to the computer user and may increase the ease-of-use of the computer. However, the power used by such a display can be a large portion of the total power consumed by a computer system. This is especially true for battery-powered portable systems such as laptop, notebook, and hand-held computers, and personal-digital assistants (PDA's). Reducing the power consumption of the display sub-system allows for a smaller, lighter-weight battery to be used, or for longer battery life.

FIG. 1 is a diagram of a display, which could be a cathode-ray-tube (CRT) video display, or a flat-panel liquid-crystal display (LCD) or other type of display. An image is formed on the display screen by selectively energizing or illuminating small dots or pixels on the screen. In a CRT, a pixel is energized by an electron gun that directs a beam of energizing electrons to a particular point on the screen. The electron beam is scanned from left to right in a horizontal line and pulsed to illuminate some points on the line but not others. The screen is divided into a number of horizontal lines 10, 12, 16, with each line comprising a number of pixels. The pixels in a line are illuminated one-by-one from the left side to the right side of a horizontal lines 10, 12, 16.

Once the entire horizontal line 10, 12, 16 has been scanned, the electron beam is disabled or "blanked" so that no pixels are energized and the electron beam is re-traced back to the beginning on the next horizontal line 12. This horizontal re-trace 14 follows a diagonal path. After re-trace, the blanking is ended and the next horizontal line 12 is scanned. The process of scanning a horizontal line and re-tracing is repeated until all lines are scanned. Once scanning of the last horizontal line 16 is complete, the electron beam is returned to the beginning of the first line 10 by a vertical re-trace 18. The electron beam is again blanked to prevent any illumination while the electron beam is being retraced to the top of the screen.

Other display technologies also divide a screen into horizontal lines comprised of pixels that are either illuminated or not. A horizontal recovery or blanking period between horizontal lines and a vertical recovery or blanking period to return to the top of the screen may also be necessary with these display technologies, even though an electron beam is not used.

FIG. 2 is a waveform diagram showing a video clock 20 that is used to clock pixel data to a display. When horizontal blanking signal 22 is low, pixel data is clocked by video clock 20 to the display. However, when horizontal blanking signal 22 is high, pixel data is not clocked to the display. Instead, the electron beam is re-traced to the beginning of the next line. Likewise, when vertical blanking signal 24 is high, pixel data is not clocked to the display as vertical re-tracing is occurring. Thus during time period 10T, horizontal line 10 is being scanned and its pixels are being clocked to the display by the video clock 20. During horizontal re-trace period 14T, the pixels are not clocked to the display as horizontal re-trace 14 is in progress. Horizontal line 12 is scanned during period 12T, while the last horizontal line 16 is scanned during period 16T. Vertical re-trace 18 occurs during vertical blanking period 18T, and pixel data is not clocked to the display during this period 18T. Shading indicates time periods when pixel data is not being clocked to the display.

For clarity, FIG. 2 is not drawn to scale. Each line has many pixels, and many lines are in a screen. In a standard 640×480 resolution display, each of the 480 horizontal lines has 640 pixels, and each of these lines would require 640 video clock pulses to transmit the 640 pixels to the display. The screen is re-written or refreshed 60 times per second (60 Hz), and thus the vertical re-trace period occurs 60 times per second, while horizontal blanking occurs at a rate of 31.5 KHz: one line every 31.7 µs. Pixels must be clocked to the display at a rate of 25.175 MHz, about one pixel every 40 ns.

A simple calculation reveals the magnitude of the blanking periods. The 640 pixels require 640×40 ns/pixel=27.2 µs to scan. Thus horizontal blanking requires 31.7 µs −27.2 µs=4.5 µs, or 4.5/31.7=14% of the horizontal scan time. Vertical blanking occurs once every 16.6 ms, while the 480 lines take 480×31.7 µs=15.2 ms. Thus 16.6 ms−15.2 ms=1.4 ms is spent just on vertical blanking and re-tracing, or 1.4/16.6=8% of the total refresh cycle. While clocking pixels to the display requires 640×480×40 ns=12.3 ms, horizontal and vertical blanking occupy the remaining 4.3 ms. Thus the time when pixels are not being written to the display screen is 4.3/16.6=26% of the total time!

Pixel data is stored in a video memory and transferred to the display through a video FIFO buffer. The video FIFO buffer can buffer many pixels, perhaps one or more horizontal lines of pixels, or only a fraction of a horizontal line. A memory clock, MCLK 30, clocks pixel data from the video memory to the video FIFO buffer. Strobe 32 is low when pixel data is being transferred to the video FIFO buffer. Strobe 32 goes low one or more times for every horizontal line, filling the video FIFO buffer before the horizontal line is scanned. A host may update what is displayed by writing data to the video memory using a bus clock, BCLK 40. A host strobe 42 indicates when update data is to be written to the video memory. The update data is first written to a buffer or FIFO before being written to the video memory, allowing the bus clock 40 and the memory clock 30 to be different frequencies and asynchronous to each other. Likewise, the video FIFO buffer allows the video clock 20 and the memory clock 30 to be asynchronous to each other and at different frequencies.

For much of the time in a typical portable computer system, the user is simply looking at the screen and the computer's processor and other sub-systems are performing no useful operations. It is therefore desired to reduce power consumption of the display sub-system while the display is active by disabling certain clocks in the display sub-system when not in use, but enabling these clocks when necessary to refresh the display screen, or to perform other functions such as BLT block transfers, DRAM refresh, or host transfers.

What is desired is a video display sub-system with reduced power consumption. It is desired to manage the various clocks and to disable them when they are not needed.

SUMMARY OF THE INVENTION

A method is for conserving power when displaying an image on a screen, where the image is comprised of a plurality of pixels arranged in a plurality of horizontal lines. The method manages the video clocks and follows these steps:

(a) pulsing a pixel transfer clock for a transfer of a horizontal line in the plurality of pixels to the screen during a horizontal scan time period;

(b) pausing the pixel transfer clock and pausing the transfer of the plurality of pixels to the screen during a horizontal blanking period;

(c) repeating steps (a) and (b) until the horizontal line is a last horizontal line on the screen; and (d) pausing the pixel transfer clock and pausing the transfer of the plurality of pixels to the screen during a vertical blanking period after all pixels in the last horizontal line have been transferred to the screen.

The image is displayed on the screen with a reduced number of pulses of the pixel transfer clock, thereby reducing power consumption.

In further aspects of the invention, the screen is continuously refreshed when, after the vertical blanking period has finished, steps (a), (b), (c), and (d) are repeated. A point on the screen is energized or not energized in response to a pixel transferred to the screen. A horizontal re-trace occurs during the horizontal blanking period and a vertical re-trace occurs during the vertical blanking period. Each pixel in the plurality of pixels indicates an intensity of a point on the screen or a color of the point on the screen. The screen may be a cathode-ray-tube (CRT), and an electron beam is retraced during the horizontal blanking period and during the vertical blanking period. In another aspect the invention is a video memory controller comprising a memory clock generation means for generating a memory clock. The memory clock transfers display information for display by a screen. The memory clock generation means includes means for receiving a request for a memory transfer from a requestor, means for enabling and pulsing the memory clock in response to the request, and means for disabling the memory clock and not pulsing the memory clock once the memory transfer is complete.

A video memory means is for storing display information for the screen. A memory controller means is responsive to the memory clock and controls the memory transfer of the display information to and from the video memory means. Thus the video memory controller uses the memory clock that is disabled when no transfer is occurring, reducing power consumption.

The transfer request can include a variety of sources. A synchronous transfer in progress indication from the memory controller means indicates that the memory transfer is not yet complete. A BLT request is from a BLT engine while a hardware cursor request is from a hardware cursor display means. Asynchronous requests include a video buffer request indicating a need to refresh a video buffer for transferring the display information to the screen and a host request indicating a request for data transfer to the video memory means from a host.

In other aspects of the invention a video sub-system for displaying an image on a screen includes a clock generation means for generating a video clock. The video clock transfers pixels of display information for display by the screen during a scanning period of time, and the video clock is pulsed during the scanning period of time. A blanking means is coupled to the clock generation means, and periodically disables the video clock during a blanking period of time. The video clock is not pulsed during the blanking period of time.

A video memory stores pixels of display information for a whole screen. A memory controller is responsive to a memory clock. It controls transfer of the pixels of display information to and from the video memory. A video buffer receives the pixels of display information from the memory controller, and stores a subset of the pixels of display information from the video memory. A serial transfer means is coupled to receive the subset of the pixels of display information from the video buffer. It transfers pixels of display information to the screen. The pixels of display information are transferred to the screen serially in synchronization to the video clock. The video clock pulses at least once for every pixel transferred to the screen. Each pixel represents a point on the screen.

Thus the image is displayed on the screen using the video clock that is periodically disabled, reducing power consumption during display of the image. The video clock can be disabled during the horizontal or vertical retrace periods. A memory clock for the memory controller is enabled or pulsed only when a request for a transfer is received or in progress. This memory clock is generated from a clock synthesizer that may be disabled during a standby mode. However, the clock input to the synthesizer may be used as the memory clock when in standby mode. These and other aspects of the invention allow for power reduction in a video sub-system during the display of an image on the screen.

DETAILED DESCRIPTION

Figure 1:
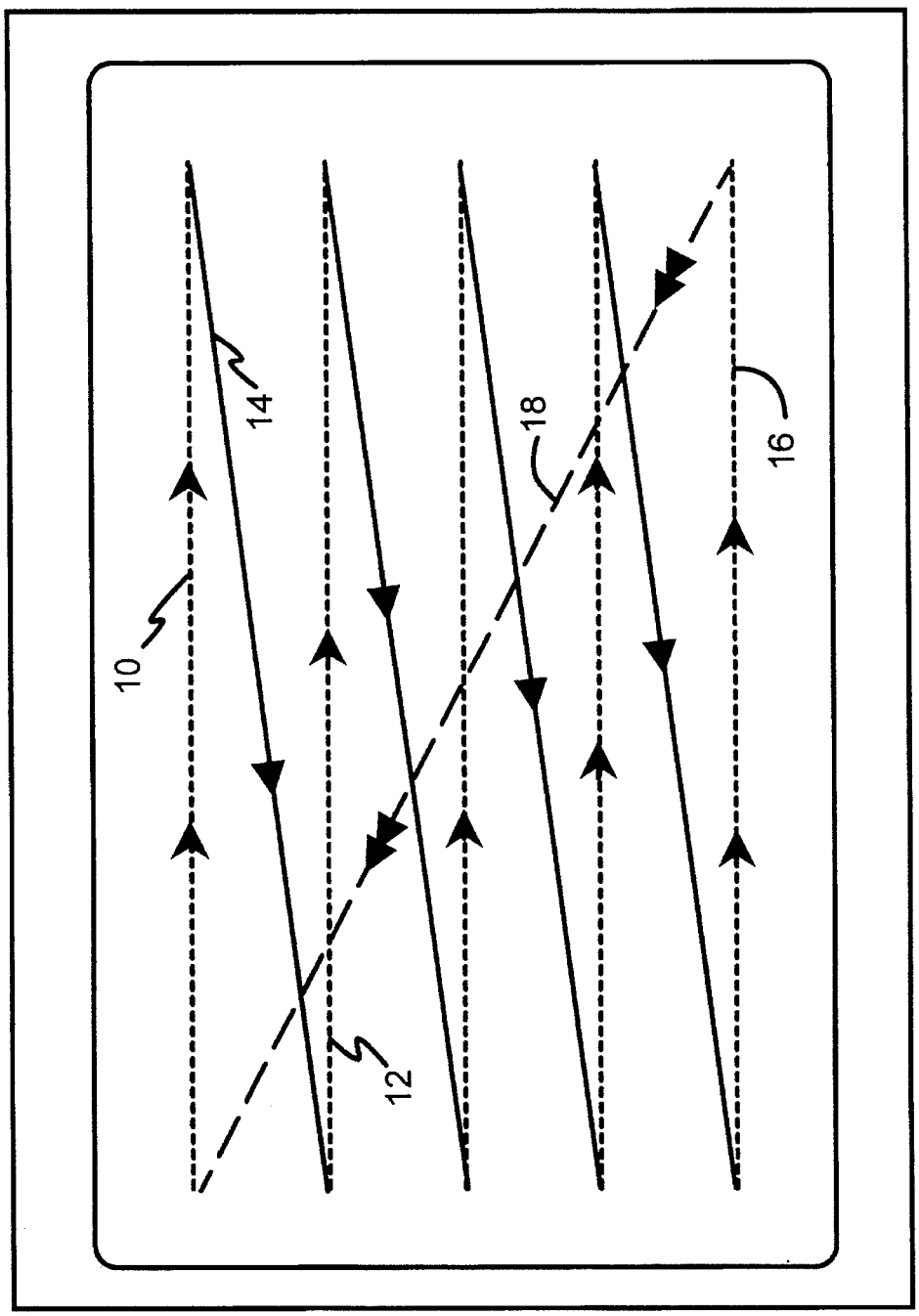
FIG. 1 is a diagram of a cathode-ray-tube (CRT) video display.

The present invention relates to an improvement in video controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Power is dissipated by circuitry that charges or discharges a capacitive load. Free-running clocks applied to typical CMOS logic gates and registers can consume a significant amount of power, even when the circuitry is not performing useful work. Although individual capacitive loads are not large, with the large number of gates used in VLSI (very-large-scale-integration) devices, the cumulative load is large. Thus it is desirable to disable the clocking of circuitry when that circuitry is not performing useful work.

Video controllers contain large numbers of logic gates to transfer pixels from the video memory to the display screen, and to update the video memory when written by the CPU or other external video sources. These logic gates are clocked by several free-running clocks. While it is possible to reduce power consumption by disabling all clocks and possibly cutting all power to the video sub-system, this has the undesirable effect of turning off the display to the user. Power reduction while the display is still active is also desired.

The inventor has realized that power can be significantly reduced while the display is still active. The various clocks in the video sub-system are disabled when pixel data is not being transferred to the display screen, or to the video memory. As calculated above in the background section, about 26% of the time pixel data is not being transferred to the display. Power consumption can be cut by disabling the video clocks during this time. The video clocks in the display sub-system are enabled only when pixel data is being transferred. Since pixel data is not being transferred about 26% of the total time that the display is active, power consumption, averaged over an entire screen refresh cycle, can be cut over a prior-art system.

The inventor has also realized that a video controller may be divided into several sub-blocks. Not all of these sub-blocks are normally active. By providing separate clocks to these sub-blocks, and disabling these clocks when the sub-block is not performing useful work, power consumption can be reduced. Power consumption is reduced both by enabling only the particular sub-blocks that are necessary to perform a particular function, and by enabling a particular sub-block only when performing the particular function. Clocks are disabled at other times and for other sub-blocks.

For example, the video memory controller has a clock, MCLK, that is only enabled when data is being transferred to or from the video memory, or when the DRAM in the video memory is being refreshed. Likewise, the interface to the host has a clock, BCLK, that is only enabled when data is being transferred to or from the host. Thus the BCLK clock to the host interface does not have to be enabled when the video memory controller is transferring data to another sub-block using the separate MCLK. MCLK is enabled only when this data transfer is occurring, and MCLK is disabled after the data transfer completes.

For saving active chip power, while the video sub-system is running, the memory controller clock MCLK is stopped except when an access is required to the video memory. Slowing this MCLK or delaying clock edges will result in performance degradation for the host and possibly flickering on the screen from variations in the rate of screen refresh. The DRAM or VRAM chips in the video memory are very sensitive to the timing and signal integrity of their control signal, such as RAS and CAS. Glitches on these control signals may cause data loss. Hence care is needed when starting and stopping the clocks that generate these control signals. It is necessary to save power by powering down the memory controller. As the memory controller is powered down, the clock generation and request arbitration logic is also stopped.

A video memory is accessed by many sources, each typically having its own counters to increment addresses. In prior-art counters, an enable input to the counter determines when to increment the counter. The counter itself receives a free-running clock which burns power unnecessarily. The present invention stops the clock itself, thus sending clock edges to any counter only when necessary, reducing power consumption.

It is important that the performance of the video sub-system not be degraded by the power-saving mechanism. Prior-art systems that divided the clock down to a lower frequency degrade performance. In the present invention, the clocks run at full speed when required, but are completely stopped when not required. Since the system software provides no indication of when to start or stop the clock, the present invention accepts hardware requests for access to the video memory and other resources in the video controller from many synchronous and asynchronous sources. One or more clock is started when a request is received, and the clock continues running when back-to-back cycles are necessary, even when from different requesters. The clock is stopped when no more requests are received.

CLOCKING DATA THROUGH VIDEO SUB-SYSTEM—FIG. 3

Figure 3:
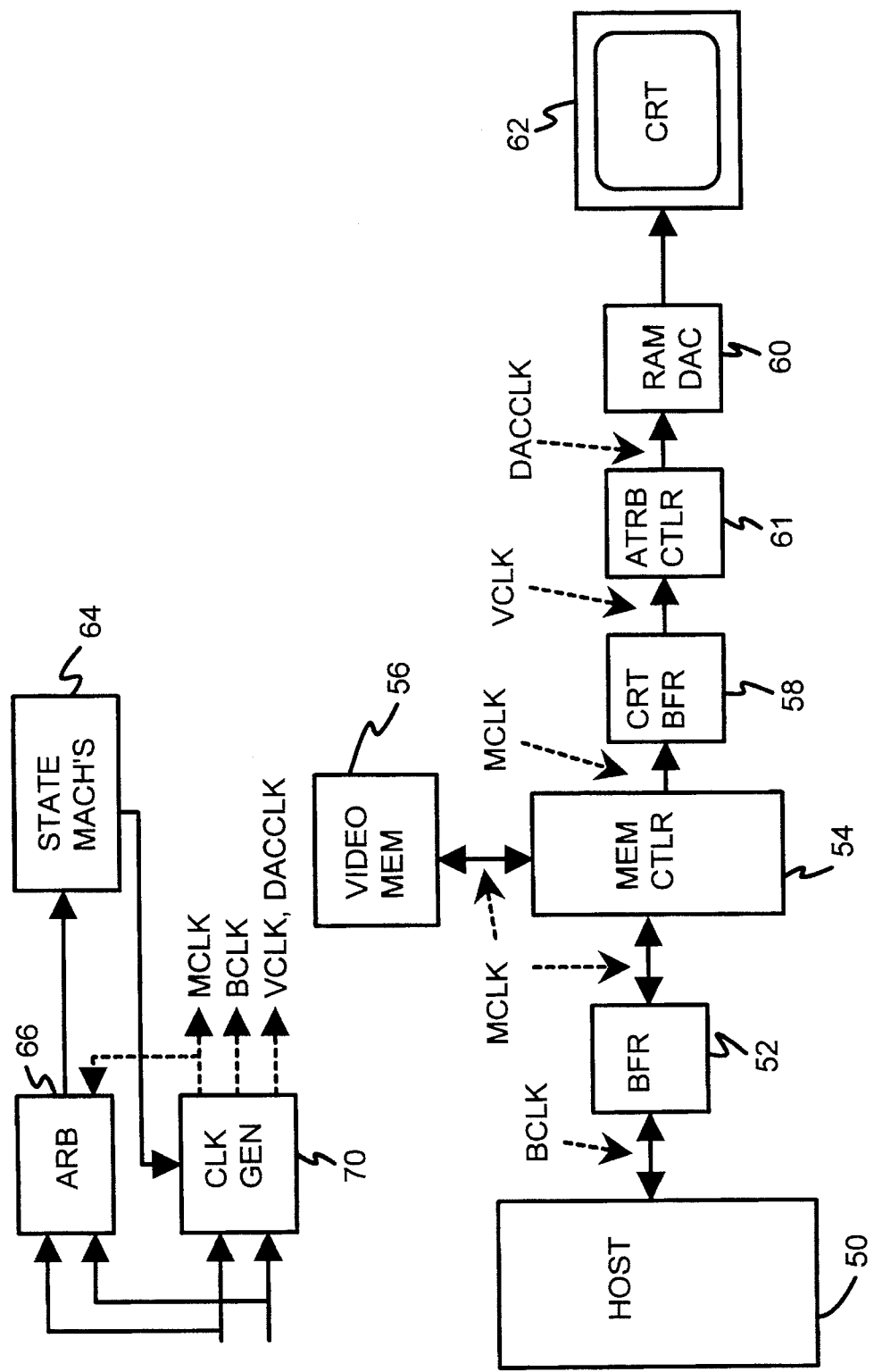
FIG. 3 shows a cathode-ray-tube (CRT) controller sub-system.

FIG. 3 shows a cathode-ray-tube (CRT) controller sub-system. A host 50 such as a personal computer expansion bus updates information to be displayed on CRT monitor 62. The update information is written to a host buffer 52 synchronized to a host bus clock, BCLK. Memory controller 54 receives a request from host buffer 52 when update information has been written by the host. Memory controller 54 transfers the update information from host buffer 52 to video memory 56 once the request from the host buffer is granted priority from arbitration with other requesters. The update information is transferred under control of state machines 64 that are synchronized to the memory clock, MCLK. Arbitration unit 66 arbitrates between several requesters desiring access to the video memory 56. These requesters produce host requests, display refresh requests, and dynamic-RAM refresh requests to refresh the dynamic memory chips in video memory 56. Other requestors include a half-frame buffer, hardware cursor, or icon support logic.

Pixel Data Path to Screen

The CRT monitor 62 must be continuously updated or refreshed so that the display information stored in the video memory 56 may be visible. Thus a steady stream of display data must be transferred to the CRT from the video memory 56, which contains a complete "snapshot" of the information to display. Since the video sub-system may output different resolutions when different display modes are used by the various programs running on the host 50, the pixel or video clock VCLK will vary as needed to support the current resolution mode. However, the memory clock MCLK will operate at a constant frequency determined by timing requirements of the video memory 56. A CRT FIFO or buffer 58 is provided to buffer the data that is transferred by memory controller 54 and synchronized to MCLK. The data buffered by CRT buffer 58 is clocked out by the asynchronous VCLK to attribute controller 61, which may modify the pixel data, perhaps by re-mapping the colors represented or blinking the pixels.

The modified pixel data is clocked out of attribute controller 61 to a RAMDAC 60 by a DACCLK. The DACCLK and the VCLK are preferably generated from the same clock source and are thus synchronous and have the same frequency. RAMDAC 60 contains a RAM that is indexed by the pixel data, and outputs digital values for red, green, and blue sub-pixels that comprise a color pixel. RAMDAC 60 also contains a digital-to-analog converter (DAC) that converts the digital color sub-pixels to analog intensity values that are transmitted to the CRT monitor 62. The DACCLK clock is used to create the analog output to CRT monitor 62 by timing the transfer of the analog pixel intensity data outputted.

Clock generator 70 generates the various clocks used by the video sub-system. The host bus clock BCLK is simply buffered from a clock supplied by the host 50. However, clock generator 70 disables BCLK when no data is being transferred from or to the host. When the clock is disabled, no high-to-low nor any low-to-high transitions occur. Thus circuitry in host buffer 52 that is coupled to the bus clock BCLK will dissipate much less power when data is not being transferred and BCLK is disabled.

Clock generator 70 also generates the video memory clock MCLK, and the video clock VCLK. VCLK and DACCLK are sometimes referred to as the pixel or dot clock, since they determine the rate that pixels or "dots" are transferred to the CRT monitor 62. DACCLK and VCLK are generated from the same source, but MCLK is asynchronous to them. These clocks are also disabled when pixel data is not being transferred, but are re-enabled when pixel transfer begins. Since pixels are not transferred during the blanking periods, these clocks can be disabled during these periods, reducing power consumption.

Since the transfer of pixels to the CRT monitor 62 is periodic, a simple counter can be used to indicate in advance when data transfer will occur. The counter can re-enable the pixel clocks and MCLK shortly before transfer begins. Thus there is no delay or loss of bandwidth for re-enabling these clocks.

There is a small delay to re-enable BCLK when the host initiates a data transfer to the video sub-system. However, arbitration by arbitration unit 66 also may require a small delay. Ideally, clock generator 70 will begin to re-enable the clock before arbitration is complete. Since the data transfer cannot begin until arbitration has completed, the clock may even be re-enabled before arbitration is finished and the transfer can begin, resulting in no effective delay for re-enabling the clock. Thus arbitration can be used to "hide" the clock re-enablement delay in some cases.

Memory Controller Clock Enabled Only When Video Memory Accessed

The memory clock MCLK is enabled when pixel data is transferred to the CRT buffer 58 destined for the CRT monitor 62, and when data is transferred from the host 50. In addition, the memory clock may be re-enabled for DRAM refresh of the video memory 56 when a DRAM refresh request is generated by an end of a horizontal line fetch, or by some other mechanism.

State machines 64 will indicate to clock generator 70 when a transfer cycle has completed and the clock may be safely disabled. A slight delay may be added before disabling the clock, allowing any pending transfers to occur before the clock is disabled. Thus the clock is enabled when a request is received, but possibly before arbitration has competed, and the clock is disabled once all transfers are complete.

The memory clock MCLK is disabled at other times. Thus the memory clock MCLK is enabled and pulsing when the video memory is being accessed, as when data is being transferred to the video buffer for display on the screen, or when the host is reading or writing the data in the video memory, or for refresh of the memory chips in the video memory 56. A significant reduction in overall power consumption is achieved because the memory clock is disabled except when in use. Because the use of the video memory varies greatly among application programs, host systems, and resolution of the screen, enabling the memory clock only when needed provides a very adaptable way to reduce power as much as possible, but allowing for higher resolutions and faster hosts that have increased demand for access to the video memory.

CLOCK WAVEFORMS—FIG. 4

Figure 4:
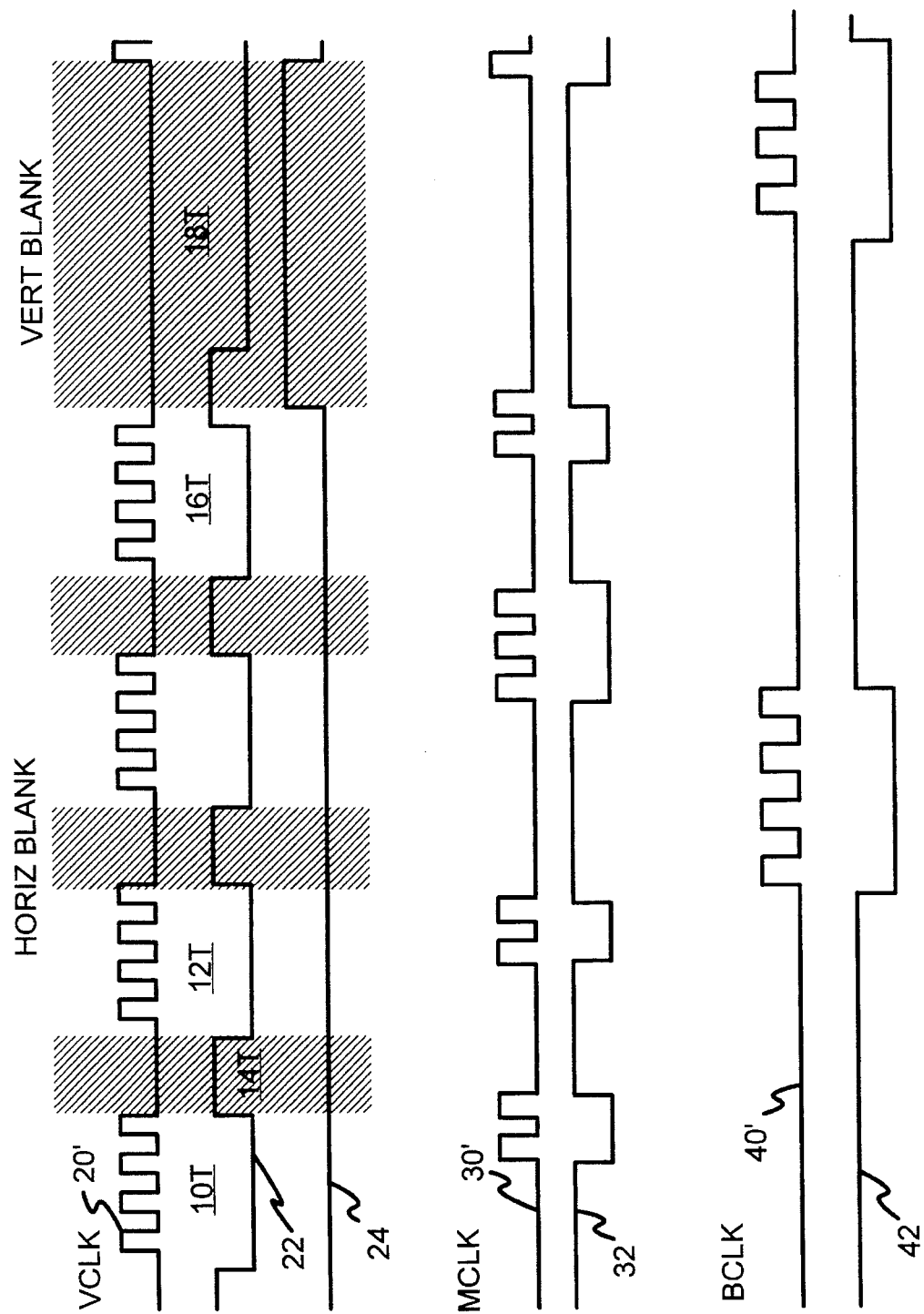
FIG. 4 shows a waveform diagram for the video sub-system of the present invention.

FIG. 4 shows a waveform diagram for the video sub-system of the present invention. The video clock used for transferring pixel data, VCLK 20', is enabled when pixel data is being transferred from the CRT buffer 58 to the RAMDAC 60. Thus VCLK is enabled and VCLK pulses occur during scanning of horizontal lines such as during periods 10T, 12T, and 16T. However, VCLK is disabled and no pulses occur when pixel data is not being transferred, as during horizontal re-trace periods such as 14T, and during vertical re-trace period 18T. Horizontal blanking signal 22 and vertical blanking signal 24 mark these periods, which are shaded in FIG. 4.

The memory clock MCLK 30' is asynchronous to video clock VCLK 20', but it is used to transfer pixel data from the video memory 56 to the CRT buffer 58 slightly before this data is transferred to the CRT monitor 62 by VCLK 20'. The size of the CRT buffer 58 relative to the number of pixels in a horizontal line for the current resolution mode determine how often the memory clock 30' must be re-enabled to load the CRT buffer 58. Also, the wider the path from the video memory 56 to the CRT buffer 58, the fewer MCLK 30' pulses will be required to transfer the pixel data. As shown in FIG. 4, CRT buffer 58 can buffer an entire line and thus MCLK 30' is only enabled once for each line. However, if CRT buffer 58 could hold only one-quarter of the line, then MCLK 30' would be re-enabled four times during each line, preferably being re-enabled just as the CRT buffer is becoming empty.

The bus clock BCLK 40' is also enabled only when data is transferred to or from the host 50. A request from the host 50 is received at or just before the leading edge of strobe 42. Data is loaded into host buffer 52, while strobe 42 is low. The bus clock may be divided into several clocks for separate blocks of logic. For example, bus cycle tracker logic may use a bus clock that is free-running so that the bus may be monitored. A first latch may also receive a free-running bus clock so that data from the host may be latched in zero wait states. When this latch is loaded, then the clock for the next stage latch is enabled. The bus clock to the rest of the bus-interface unit may also be enabled just when the cycle tracker detects a host-to-video transfer. A bus clock to the host FIFO is not enabled until after the data has been latched in from the host bus and is ready for transfer to the host FIFO. Thus, by breaking the logic into several blocks, separate clocks for these blocks may be selectively enabled when needed, reducing power consumption even when the video subsystem is enabled.

As the data enters host buffer 52, a request is sent to the memory controller 54. This request is arbitrated with the CRT refresh requests and other requests. Once the request is granted, the data is transferred from the host buffer 52 to the video memory 56. This data transfer occurs during the third low pulse of memory strobe 32 shown in FIG. 4. An extra MCLK pulse is needed as the host data is transferred to the video memory because data is also being transferred to CRT buffer 58 during the same memory strobe 32 pulse.

As FIG. 4 shows, a significant reduction in the number of clock pulses results from enabling each clock only when data is being transferred by circuitry controlled by that clock. For example, the video clock VCLK is disabled during the blanking periods when pixel data is not being transferred to the screen. The video memory clock MCLK is enabled when data is being transferred to or from the video memory 56, such as to fill the CRT buffer 58, or to receive data from the host buffer 52. Thus MCLK can be disabled when data is not being transferred, as shown in FIG. 4. Although the demands on the memory clock MCLK can vary greatly depending on the screen resolution and host requirements, the disabled time is significant. The host bus clock BCLK is enabled when data is being written to the host buffer 52, or when the host is reading data from the video memory 56. The host bus clock BCLK is disabled when such a transfer is not occurring. Thus the disabled time for BCLK is also significant, although it varies with the speed of the host and the bandwidth of data transfers from the host to the video memory 56.

For clarity, FIG. 4 is not drawn to scale. For 640×480 resolution, each line contains 640 pixels and thus 640 VCLK pulses would occur during each scanning period such as 10T, 12T, and 16T. The CRT buffer may have to be filled many times during each line, and each fill may require many MCLK pulses. Likewise host transfers may require many BCLK pulses.

CLOCK ENABLING CIRCUIT

Figure 5:
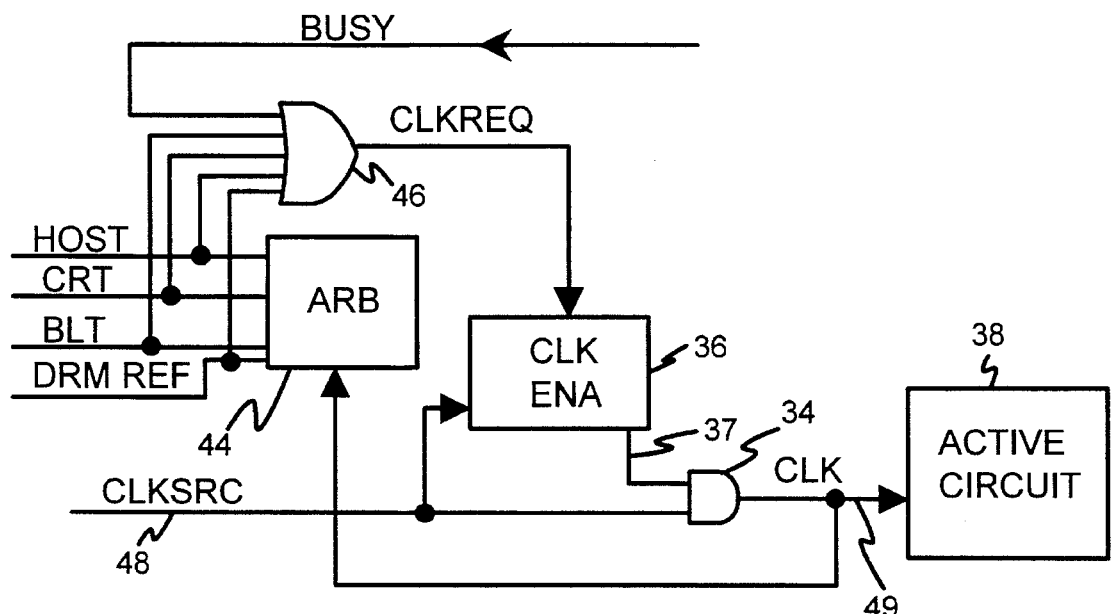
FIG. 5 shows a circuit used to selectively enable a clock.

FIG. 5 shows a circuit used to selectively enable a clock. A clock source 48, CLKSRC, is input from a clock synthesizer or an external clock source. The clock source 48 is normally free-running, but it can be disabled when a standby mode is entered, for example when the entire host is suspended or when the entire video sub-system is powered-down.

The gated CLK 49 is used to arbitrate between several requesters, such as from the host, CRT refresh, or Bit-block transfer (BLT). Arbitration logic 44 receives these inputs and determines the victor. OR gate 46 receives inputs from these requesters, and generates a clock request signal CLKREQ. OR gate 46 also receives a busy signal from one or more state machines; the busy signal indicates that a data transfer or other operation by active circuit 38 using gated CLK 49 is in progress, and thus gated CLK 49 must be kept enabled.

Clock enable block 36 receives the clock request signal CLKREQ from OR gate 46, and synchronizes this signal to clock source 48 CLKSRC. By synchronizing clock request signal CLKREQ to the clock source 48, short runt pulses or glitches are prevented from being outputted on gated clock 49. Glitches on a clock signal are highly undesirable since registers clocked by a glitch can produce metastable outputs. AND gate 34 receives enable signal 37 from clock enable block 36. AND gate 34 allows clock source 48 to pass through when enable signal 37 is high, but disables gated clock 49 when enable signal 37 is low. AND gate 34 causes gated clock 49 to remain low, and thus blocks any clock pulses from clock source 48 when enable signal 37 is low. Active circuit 38 has reduced power consumption when gated clock 49 is disabled by enable signal 37.

Figure 6:
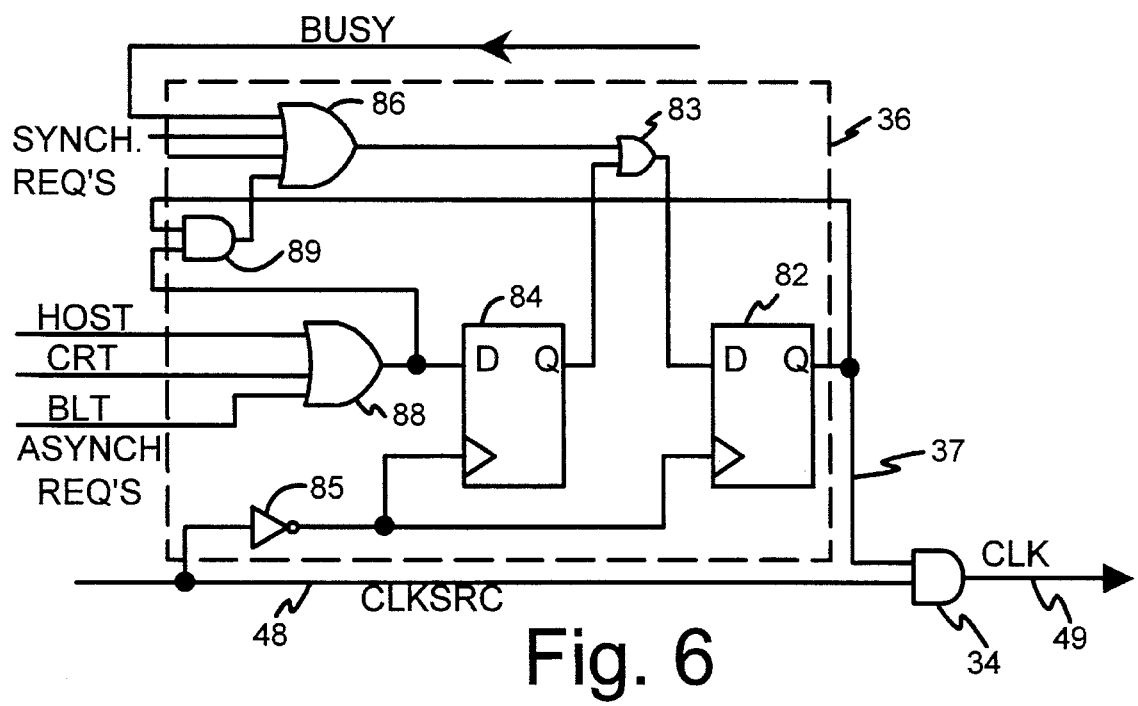
FIG. 6 shows another circuit used to selectively enable a clock.

FIG. 6 shows another circuit used to selectively enable a clock. The same reference numerals described in reference to FIG. 5 are used in FIG. 6 for similar elements. A clock source 48, CLKSRC, is input from a clock synthesizer or an external clock source. AND gate 34 passes clock source 48 through to gated clock 49 when enable signal 37 is high, but disables gated clock 49 when enable signal 37 is low, reducing power consumed by circuitry clocked by gated clock 49.

Enable signal 37 is output from flip-flop 82, which is clocked by an inverted clock source that is output from inverter 85. Enable signal 37 outputted from flip-flop 82 can only change stage or transition when clock source 48 transitions from high-to-low. Thus when enable signal 37 changes state, which could potentially cause a glitch on gated clock 49, the clock source 48 input to AND gate 34 is low. This low on the clock source input to AND gate 34 causes its output, gated clock 49, to remain low regardless of the logic state on the other input to AND gate 34. Thus the other input, which is enable signal 37, can safely change state or even glitch, since the output of AND gate 34 will remain constant. Glitches will not be produced or passed through to gated clock 49 when the clock is enabled or disabled.

Any number of synchronous requests, which are synchronous to clock source 48, are input to OR gate 86. The busy signal from one or more state machines is also input to OR gate 86. Any of these synchronous requests will generate a high output of OR gate 86, which will be transmitted to the D-input of flip-flop 82 by OR gate 83. On the first high-to-low transition of clock source 48 after a synchronous requester becomes active, enable signal 37 will go high, enabling gated clock 49.

Any number of asynchronous requests, which are asynchronous to clock source 48, are input to OR gate 88. Any of these asynchronous requests will generate a high output of OR gate 88, which is inputted to the D-input of flip-flop 84. Flip-flop 84 is also gated by the inverted clock source output from inverter 85, and synchronizes the asynchronous requests to clock source 48. These re-synchronized requests are also transmitted to flip-flop 83 by OR gate 83. On the second high-to-low transition of clock source 48 after an asynchronous requester becomes active, enable signal 37 will go high, enabling gated clock 49.

Any asynchronous request can also be input to gate OR 86 if the gated clock 49 is enabled, since glitches are not possible and the new asynchronous request merely keeps the clock enabled longer. AND gate 89 receives these asynchronous requests output from OR gate 88, and inputs them to OR gate 86 when enable signal 37 is active and thus gated clock 49 is active. AND gate 89 allow these asynchronous requests to bypass flip-flop 84 when the gated clock 49 is already running, thus reducing the delay that would occur to re-enable the clock.

CLOCK TREE—FIG. 7

Figure 7:
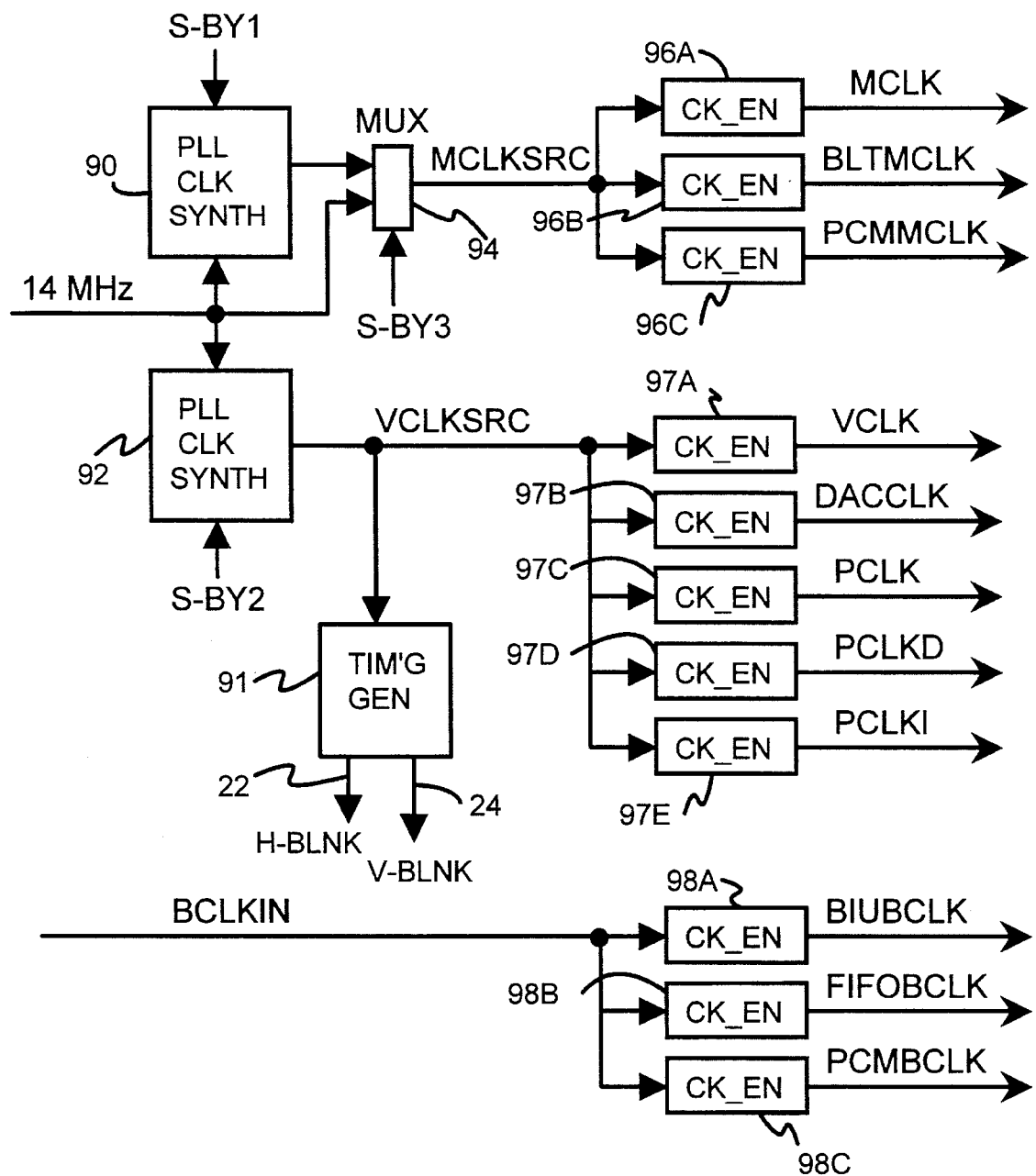
FIG. 7 illustrates the clock distribution and enabling network of the preferred embodiment.

FIG. 7 illustrates the clock distribution and enabling network of the preferred embodiment. A 14 MHz clock is input from an external clock source such as a crystal oscillator. This 14 MHz clock is a free-running clock, except possibly when powered down or disabled during a suspend or stand-by mode when the entire video sub-system is disabled. A clock synthesizer 92 uses the 14 MHz clock to produce video clock source VCLKSRC. Video clock source VCLKSRC may be completely disabled by asserting video stand-by signal S-BY2, which powers-down clock synthesizer 92. Clock synthesizer 92 is programmable, allowing the frequency of video clock source VCLKSRC to vary as needed by the current resolution mode being displayed by a user program running on the host.

Figure 2:
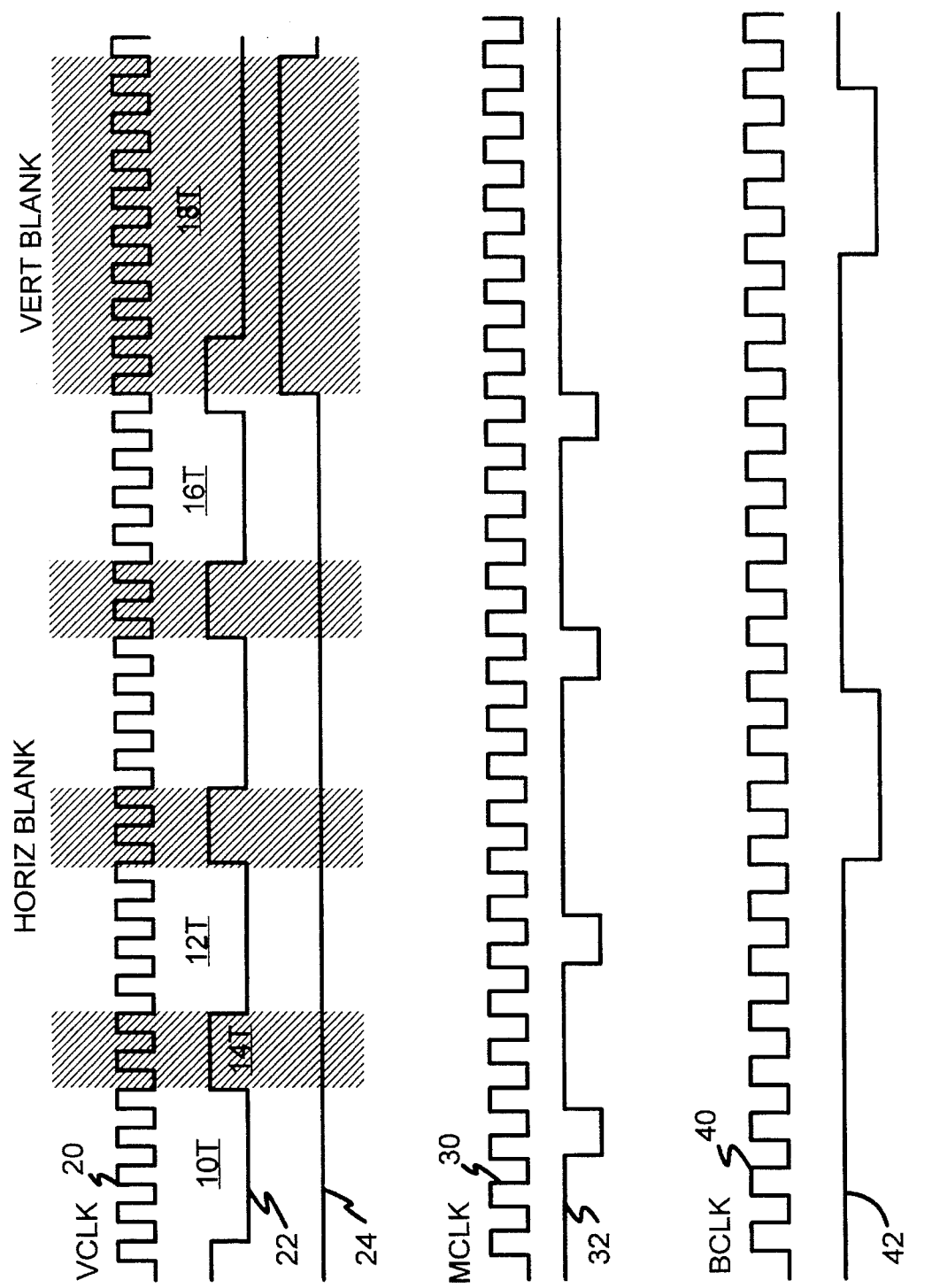
FIG. 2 is a waveform diagram showing a video clock used to clock pixel data to a display

Timing generator 91 receives the video clock source VCLKSRC from clock synthesizer 92, and programmable information indicating the resolution of the current display mode. This programmable information determines the number of clocks or pixels per line, and the number of lines displayed on the screen, and the duration of the blanking periods. Timing generator 91 generates horizontal blanking signal 22 and a vertical blanking signal 24 to define horizontal and vertical retrace periods, as was shown in FIGS. 2 and 4. Since timing generator 91 must generate the horizontal and vertical blanking signals 22, 24 even when pixel data is not being transferred to the screen, as during the retrace periods, timing generator 91 must receive the free-running video clock source VCLKSRC.

Video clock source VCLKSRC is coupled to several clock gating blocks 97A–97E. Each clock gating block selectively enables and disables a clock that is coupled to a different logic block in the video sub-system. Clock gating blocks can be implemented with the logic shown in FIGS. 5 and 6. Clock gating block 97A outputs video clock VCLK, which is used to clock pixel data from the CRT buffer 58 to the attribute controller 61 of FIGS. 3 and 8. Clock gating block 97B outputs RAMDAC clock DACCLK, which is used to clock pixel data from attribute controller 61 to RAMDAC 60, and is used within RAMDAC 60 to generate the analog output to the CRT monitor 62.

Additional panel clocks are used when a flat-panel display is active. In some systems, both a CRT and a flat-panel display can be viewed at the same time, or only the CRT or only the flat-panel display is enabled at any one time. When the flat panel is being used, clock gating block 97C outputs panel clock PCLK, which clocks pixel data from RAMDAC 60 to Gray-scale controller 78. Clock gating block 97D generates the direct panel clock $PCLK_D$, which clocks data from Gray-scale controller 78 to LCD panel or screen 80. Certain types of flat-panel displays known as "dual-scan" displays have a higher refresh requirement. For these dual-scan panels, a second stream of pixel data is supplied to a second half of the flat-panel display by indirect panel clock $PCLK_I$, which is generated by clock gating block 97E.

As Table 1 shows, all of the video clocks are enabled only for dual-scan flat-panel displays. Clock gating blocks 97A–97E completely disable the clocks when not needed by the particular display type, as indicated by "Disabled" in Table 1. Clocks that are listed as "On" in Table 1 are selectively enabled only when pixel data is being transferred. Thus even the "On" clocks are disabled during blanking and re-tracing and other periods, reducing power consumption significantly.

TABLE 1

| | Video Clocks | | |
|---|---|---|---|
| Video Clock | CRT Only | Single-scan LCD | Dual-scan LCD |
| VCLK | On | On | On |
| DACCLK | On | On | On |
| PCLK | Disabled | On | On |
| $PCLK_D$ | Disabled | On | On |
| $PCLK_I$ | Disabled | Disabled | On |

The clock gating blocks do not alter the frequency of the clocks. Thus all the video clocks: VCLK, DACCLK, PCLK, $PCLK_D$, and $PCLK_I$ all have the same frequency as VCLKSRC. Dividing the clock up into several clocks helps power conservation by enabling the clock just to those particular logic blocks needing the clock. Power is conserved in two ways—by enabling the clock only to those logic blocks needing the clock to perform operations, and by enabling the clock only when data is actually being transferred, during the scanning of the horizontal line.

The 14 MHz clock is also input to clock synthesizer 90, and to Multiplexer or mux 94. Clock synthesizer 90 preferably produces a constant-frequency output of 25 to 60 MHz, a frequency that is chosen to optimize the timing of accesses to the video memory 56. This frequency may, however, be programmable for the different speeds of DRAM chips used in the video memory 56. Clock synthesizer 90 may be powered-down or disabled by asserting its stand-by input S-BY1. The generated clock from clock synthesizer 90 is sent to mux 94, which selects the synthesized clock when standby mode is off. When stand-by mode is on, mux 94 selects the 14 MHz clock, rather than the synthesized clock. A third stand-by signal, S-BY3, may be used to control mux 94. Although the 14 MHz clock is much slower than the synthesized clock, the clock synthesizer requires several milli-seconds (ms) to power back up after stand-by mode and produce a stable output. A phase-locked loop (PLL) in the clock synthesizer 90 must stabilize before the synthesized clock output can be safely used. As memory requests can appear at random times, the memory clock may have to be re-started without advanced warning. Thus mux 94 allows memory cycles to occur, but at the slower 14 MHz frequency, when stand-by mode is active. This can occur when the video sub-system is in stand-by mode, and the display is temporarily turned off, but the host is still operational. Some systems will automatically put the display into standby mode after a fixed period of time when no host activity has occurred. Another possible occurrence is when the DRAM in video memory 56 needs to be refreshed, but the display sub-system is in stand-by mode.

Mux 94 outputs memory clock source MCLKSRC, which is the synthesized clock except when stand-by mode is on, when MCLKSRC is the slower 14 MHz clock. Three clock gating blocks 96A, 96B, and 96C receive memory clock source MCLKSRC and selectively output a clock when a request is received for a transfer or operation using a logic circuit that is coupled to that clock. Thus clock gating block 96A outputs memory clock MCLK when a request for a transfer to or from video memory is received or in progress, or when a DRAM refresh is needed. Clock gating block 96B outputs BLT memory clock BLTMCLK when a request is received for a BLT block transfer or other operation by the BLT engine 72 of FIG. 8. A PCMCIA expansion slot may also require a PCMCIA clock PCMMCLK for its own operations. This clock is also generated by clock gating block 96C from memory clock source MCLKSRC.

The bus clock BCLKIN is received from the host's bus. BCLKIN is a free-running clock. However, power in the video sub-system can be conserved by disabling this clock when the host is not transferring data to or from the video sub-system. Additionally, power can be conserved by dividing the clock into separate clocks for the different logic blocks of active circuitry that need the bus clock. Thus clock gating blocks 98A, 98B, 98C divide the bus clock BCLKIN into three clocks, and enable each clock only when a request is received that must transfer data through a logic block using the bus clock. Clock gating block 98A selectively enables the bus-interface unit (BIU) bus clock BIUBCLK, which clocks the circuitry in host BIU 51 of FIG. 8. Clock gating block 98B selectively enables the FIFO bus clock FIFOBCLK, which clocks the circuitry in host buffer or FIFO 52 of FIG. 8. The BIU and FIFO bus clocks may not be enabled at exactly the same times because the data transfer may be pipelined. For example, data written from the host will first need the BIU before being transferred to the FIFO. The BIU bus clock will be enabled before the FIFO bus clock is enabled. A PCMCIA expansion slot may also require a PCMCIA bus clock PCMBCLK for its own operations. This clock is also generated by clock gating block 98C from bus clock BCLKIN. Clock gating block 98C selectively enables the PCMCIA bus clock PCMBCLK when a request for a PCMCIA access or operation is received.

LCD AND CRT CONTROLLER—FIG. 8

Figure 8:
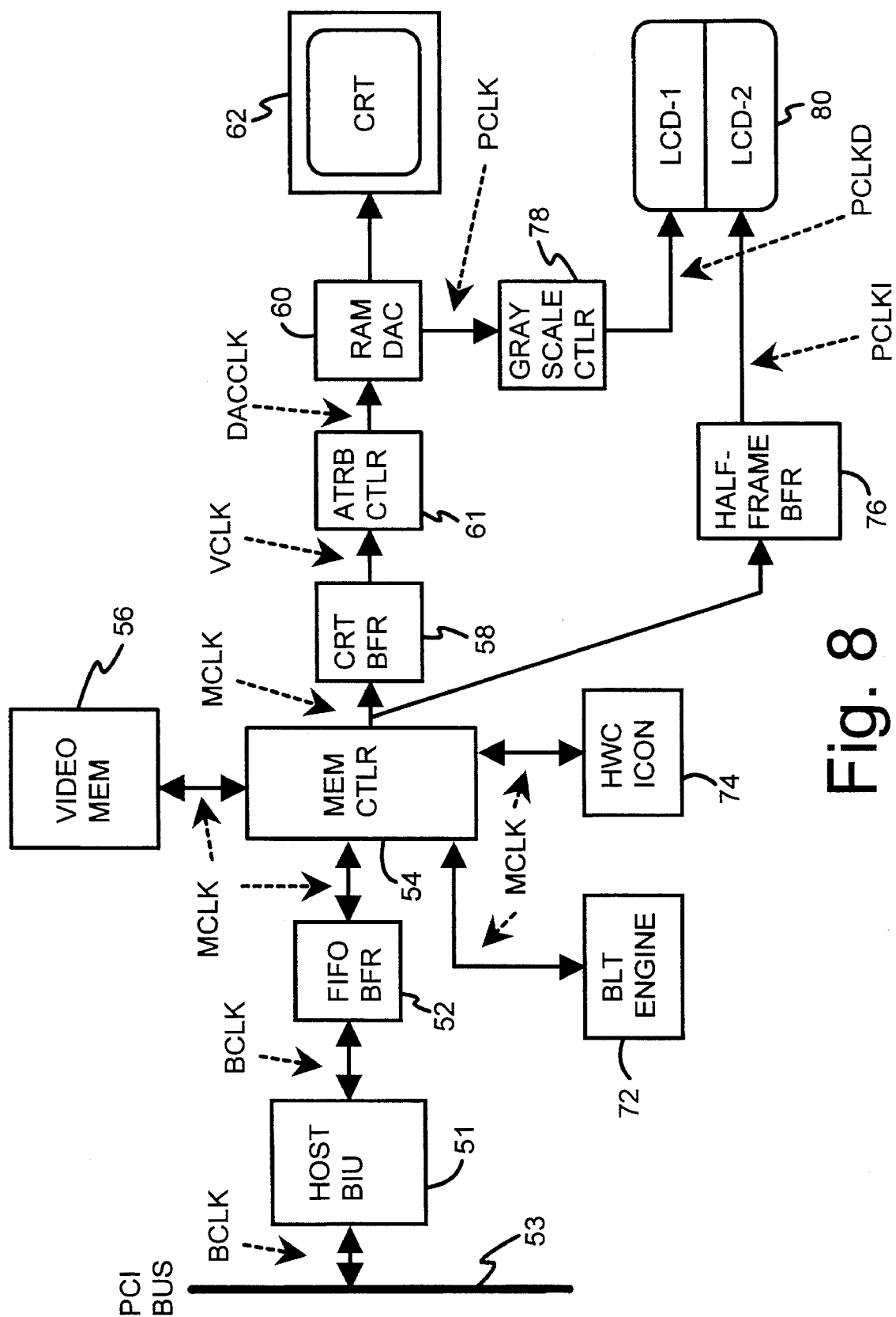
FIG. 8 shows a block diagram of a video sub-system driving a CRT and an LCD.

FIG. 8 shows a block diagram of a video sub-system driving a CRT and an LCD. A host bus such as a PCI bus 53 on the host transfers data to and from host buffer 52 with the aid of host bus-interface unit 51. A PCI bus clock BCLK is provided on the host's PCI bus 53. PCI bus 53 is an industry-standard interface bus defined by a consortium of personal computer manufacturers. The PCI bus writes data to host buffer 52 in rapid "bursts" synchronized to BCLK.

A Fifo synchronous to the host bus clock BCLK, such as host buffer 52, is necessary for supporting higher BCLK frequencies such as 33 MHz. Long bursts from the host can be supported by providing larger Fifo's. However, the larger prior-art Fifo's can consume more power, even when data is not being transferred. The present invention stops the clock to a Fifo such as host buffer 52 except when data is being transferred through the Fifo. A small front-end bus cycle monitor or tracker will always be running and will enable the clock to the Fifo when a bus cycle is decoded by the cycle tracker for the video controller. Because it is not known in advance if any particular host bus cycle is for the video controller, or for another device, having a free-running cycle tracker allows for a fast response to the cycle, while reducing power because the Fifo is only turned on once the cycle tracker decodes a cycle that will load the Fifo. Zero waits states and power reduction are possible with this approach.

Memory controller 54 uses memory clock MCLK to transfer host data to and from the host buffer 52. Video memory 56 may require periodic refreshing to prevent data loss from leakage in the dynamic memory chips in video memory 56. Block transfers and manipulation of the video data in video memory 56 may be accomplished by BLT engine 72, which itself operates using MCLK. A hardware cursor and icon-drawing logic is provided by HWC logic 74. Memory controller 54 transfers video data to and from HWC logic 74 and video memory 56.

Memory controller 54 also writes pixel data from video memory 56 to CRT buffer 58 for refreshing CRT monitor 62 and/or LCD screen 80. Data may also be written to half-frame buffer 76, which buffers half of the screen when a dual-scan LCD screen is used.

Pixel data is transferred from CRT buffer 58 to attribute controller 61 using the video clock VCLK. Attribute controller 61 may re-map or alter the color represented by the pixel data by using a color look-up table. Other attributes, such as blinking or reverse-video characters may be applied by attribute controller 61.

Using the DACCLK, RAMDAC 60 receives the modified pixel data from attribute controller 61. RAMDAC 60 contains a RAM that is indexed by the pixel data, and outputs digital values for red, green, and blue sub-pixels that comprise a color pixel. RAMDAC 60 also contains a digital-to-analog converter (DAC) that converts the digital color sub-pixels to analog intensity values that are transmitted to the CRT monitor 62. The DACCLK clock is used to create the analog output to CRT monitor 62 by timing the transfer of the analog pixel intensity data outputted.

Digital pixel data from RAMDAC 60 is clocked to Gray-scale controller 78 by panel clock PCLK. The digital pixel data is taken from RAMDAC 60 after the RAM has been accessed and has output the digital sub-pixels, but before conversion to analog values. Gray-scale controller 78 may perform a gray-scale conversion of the color sub-pixels if LCD screen 80 is monochrome or color, or may perform some other conversion of the pixel data to a format accepted by LCD screen 80. The converted pixel data from Gray-scale controller 78 is clocked into the LCD screen 80 using the direct panel clock, $PCLK_D$. LCD screen 80 may itself include some additional control or conversion logic to manipulate the pixel data before its is visually displayed on a screen, and it may be of many different types or technologies. When the LCD screen is of the dual-panel type, pixel data is also supplied by an indirect path from half-frame buffer 76, being clocked in by indirect panel clock $PCLK_I$.

ALTERNATE EMBODIMENTS

Several other embodiments are contemplated by the inventor. For example, the various blocks of the video sub-system may be integrated onto one or more silicon substrates, depending upon the technology used. The invention has been described in terms of a combined CRT and LCD controller, but the invention could apply to desktop computers with only CRT that are designed to be energy-efficient. The invention could also be used for LCD-only systems, as stopping the memory and bus clocks execpt when needed can significantly reduce power consumption when the display sub-system is active.

The preferred embodiment used the PCI bus, but other host busses such as VESA, EISA, or ISA (AT) may be used. Many implementations of the logic disclosed herein is possible. For instance, a clock gating circuit has been shown using a positive-logic AND gate, but a positive-logic OR gate could be used with the enable signal being inverted. Inverting logic using NAND or NOR gates could likewise be used, and many combinations of more complex logic is possible. The video memory is preferably constructed of dynamic RAM chips, but more expensive Video RAM (VRAM) chips or other types of memory chips may be used.

Additionally, each of the clocks may be enabled in a staggered or pipelined fashion, when the pixel data is being transferred through the particular logic blocks controlled by that clock. For example, the panel clock PCLK may be enabled a few clock cycles after VCLK is enabled, and may be disabled a few clock cycles after VCLK is disabled, to account for the pipeline delays of the data in reaching the LCD controller from the CRT buffer.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A video sub-system for displaying an image on a screen, the video sub-system comprising:

clock generation means for generating a video clock, the video clock for transferring pixels of display information for display by the screen during a scanning period of time, the video clock pulsing during the scanning period of time;

blanking means, coupled to the clock generation means, for periodically disabling the video clock during a blanking period of time, the video clock not pulsing during the blanking period of time;

video memory means for storing pixels of display information for a whole screen;

memory controller means, responsive to a memory clock, for controlling transfer of the pixels of display information to and from the video memory means;

video buffer means, receiving the pixels of display information from the memory controller means, for storing a subset of the pixels of display information from the video memory means;

serial transfer means, coupled to receive the subset of the pixels of display information from the video buffer means, for transferring pixels of display information to the screen, the pixels of display information being transferred to the screen serially in synchronization to the video clock, the video clock pulsing at least once for every pixel being transferred to the screen, each pixel representing a point on the screen;

second clock generation means for generating the memory clock, the second clock generation means including means for receiving a periodic request for a memory transfer from the video buffer means;

means for enabling and pulsing the memory clock in response to the periodic request; and means for disabling the memory clock and not pulsing the memory clock once the subset of the pixels of display information from the video memory means is loaded into the video buffer means;

a host buffer, including means for receiving display update information from a host;

means for generating a host request to the second clock generation means;

means for enabling and pulsing the memory clock in response to the host request; and means for disabling the memory clock and not pulsing the memory clock once the display update information from the host is written to the video memory means, whereby the memory clock is not pulsed after a memory transfer or a host transfer is completed, reducing power consumption by the video sub-system, and whereby the image is displayed on the screen using the video clock that is periodically disabled, reducing power consumption during display of the image.

2. The video sub-system of claim 1 wherein the serial transfer means further comprises:

conversion means, for converting the subset of the pixels of display information from the video buffer means into pixels of display information in a display format for display on the screen, whereby the pixels of display information from the video memory means are converted by the conversion means into pixels that are in a display format for display on the screen.

3. The video sub-system of claim 1 wherein the blanking period of time is a horizontal blanking period.

4. The video sub-system of claim 1 wherein the blanking period of time is a vertical blanking period.

5. The video sub-system of claim 2 wherein the conversion means comprises:

an attribute controller, receiving the subset of the pixels of display information from the video buffer means, for modifying attributes of the pixels of display information;

a RAM digital-to-analog converter, coupled to the attribute controller, for re-mapping a color represented by a pixel and converting the pixel to an analog signal for transmission to the screen.

6. The video sub-system of claim 5 wherein the conversion means further comprises:

a flat-panel controller, coupled to the RAM digital-to-analog converter and receiving a re-mapped pixel from the RAM digital-to-analog converter, for converting the color represented by the pixel into a shade of gray for display on a flat-panel display screen.

7. A clock generation circuit for a video sub-system, the clock generation circuit comprising:

a clock input, the clock input being coupled to receive a free-running clock;

a first clock synthesizer, receiving the free-running clock from the clock input, the first clock synthesizer pulsing a memory source clock when a first standby mode is inactive, the first clock synthesizer not pulsing a memory source clock when the first standby mode is active, the memory source clock having a first frequency, the first frequency for accessing a video memory;

multiplexer means, receiving the free-running clock from the clock input and receiving the memory source clock from the first clock synthesizer, for selecting the free-running clock when the first standby mode is active, the multiplexer means selecting the memory source clock when a first standby mode is inactive, the multiplexer means outputting a first source clock;

a first clock gating circuit, receiving the first source clock from the multiplexer means, and receiving a transfer request, the first clock gating circuit outputting the first source clock when the transfer request is received, the first clock gating circuit outputting a constant signal if the transfer request is not received, the first clock gating circuit outputting the constant signal upon completion of a transfer, the constant signal being absent any clock pulses;

a video clock synthesizer, receiving the free-running clock from the clock input, the video clock synthesizer pulsing a video source clock when a video standby mode is inactive, the video clock synthesizer not pulsing a video source clock when the video standby mode is active, the video source clock having a video frequency, the video frequency for providing pixels to a display screen; and a video clock gating circuit, receiving the video source clock from the video clock synthesizer, and receiving a periodic request, the video clock gating circuit outputting the video source clock when the periodic request is received, the video clock gating circuit outputting a constant signal if the periodic request is not received, the video clock gating circuit outputting the constant signal upon completion of a periodic transfer, the constant signal being absent any clock pulses, whereby power consumption is reduced by outputting the first source clock when a transfer is pending but otherwise outputting the constant signal and by outputting the video source clock when a periodic transfer is pending but otherwise outputting the constant signal.

8. The clock generation circuit of claim 7 further comprising a second clock gating circuit, receiving the first source clock from the multiplexer means, and receiving a block transfer request, the second clock gating circuit outputting the first source clock when the block transfer request is received, the second clock gating circuit outputting a constant signal if the block transfer request is not received, the second clock gating circuit outputting the constant signal upon completion of a block transfer, the constant signal being absent any clock pulses, the second clock gating circuit outputting the first source clock to a block transfer engine, whereby power consumption is reduced by outputting the first source clock to the block transfer engine when a block transfer is pending but otherwise outputting the constant signal to the block transfer engine.

9. The clock generation circuit of claim 7 further comprising programmable means for setting the video frequency, coupled to the video clock synthesizer, for setting the video frequency in response to a video resolution mode to be displayed, whereby the video frequency is adjusted for different video resolutions.

10. The clock generation circuit of claim 9 further comprising a flat-panel clock gating circuit, receiving the video source clock from the video clock synthesizer, and receiving the periodic request, the flat-panel clock gating circuit outputting a flat-panel clock derived from the video source clock when the periodic request is received and a flat-panel display mode is enabled, the flat-panel clock gating circuit outputting a constant signal if the periodic request is not received, or upon completion of a periodic transfer, or the flat-panel display mode is disabled, the constant signal being absent any clock pulses.

11. A video memory controller comprising:

memory clock generation means for generating a memory clock, the memory clock for synchronizing access of display information for display by a screen; the memory clock generation means including:

means for receiving a request for a memory transfer from a requestor;

means for enabling and pulsing the memory clock in response to the request;

means for disabling the memory clock and not pulsing the memory clock once the memory transfer is complete, video memory means for storing display information for the screen; and memory controller means, responsive to the memory clock, for controlling the memory transfer, the memory controller means transferring the display information to and from the video memory means using the memory clock;

a host buffer, receiving display update information from a host; and host means, responsive to the host buffer, for generating the request for a memory transfer when the host buffer receives display update information from the host, the memory clock generation means enabling and pulsing the memory clock in response to the request, the memory clock generation means disabling the memory clock and not pulsing the memory clock once the display update information from the host is written to the video memory means, whereby the video memory controller uses the memory clock that is disabled when no transfer is occurring, and the memory clock is not pulsed after a host transfer is completed, reducing power consumption.

12. The video memory controller of claim 11 further comprising:

video buffer means, receiving the display information from the memory controller means, for storing a subset of the display information from the video memory means; and video buffer request means, responsive to the video buffer means, for generating the request for a memory transfer when the video buffer means requires replenishing of the subset of the display information;

whereby the memory clock is generated in response to the request for a memory transfer when the video buffer means requires replenishing, reducing power consumption by the video sub-system.

13. A video memory controller comprising:

memory clock generation means for generating a memory clock, the memory clock for synchronizing access of display information for display by a screen; the memory clock generation means including:

means for receiving a request for a memory transfer from a requestor;

means for enabling and pulsing the memory clock in response to the request;

means for disabling the memory clock and not pulsing the memory clock once the memory transfer is complete, video memory means for storing display information for the screen; and memory controller means, responsive to the memory clock, for controlling the memory transfer, the memory controller means transferring the display information to and from the video memory means using the memory clock;

wherein the means for receiving the request for the memory transfer from the requestor includes means for receiving synchronous requests; and means for receiving asynchronous requests;

synchronizing means, coupled to the means for receiving synchronous requests, for synchronizing the asynchronous requests and inputting the asynchronous requests after synchronization to the means for receiving synchronous requests when the memory clock is disabled, the synchronizing means inputting the asynchronous requests before synchronization when the memory clock is enabled, whereby the video memory controller uses the memory clock that is disabled when no transfer is occurring, reducing power consumption and whereby a synchronization delay is avoided when the memory clock is already enabled.

14. The video memory controller of claim 13 wherein the synchronous requests include:

a transfer in progress indication from the memory controller means, indicating that the memory transfer is not yet complete;

a BLT request from a BLT engine; and a hardware cursor request from a hardware cursor display means;

and wherein the asynchronous requests include:

a video buffer request indicating a need to refresh a video buffer for transferring the display information to the screen; and a host request indicating a request for data transfer to the video memory means from a host.

* * * * *